US008531407B2

(12) United States Patent
Tanaka et al.

(10) Patent No.: US 8,531,407 B2
(45) Date of Patent: Sep. 10, 2013

(54) INPUT APPARATUS

(75) Inventors: Tsuyoshi Tanaka, Kyoto (JP); Hitokazu Shitanaka, Fukui (JP); Kouichi Santo, Fukui (JP)

(73) Assignee: Panasonic Corporatin, Osaka (JP)

( * ) Notice: Subject to any disclaimer, the term of this patent is extended or adjusted under 35 U.S.C. 154(b) by 632 days.

(21) Appl. No.: 12/269,447

(22) Filed: Nov. 12, 2008

(65) Prior Publication Data

US 2009/0140994 A1 Jun. 4, 2009

(30) Foreign Application Priority Data

Dec. 3, 2007 (JP) ................................ 2007-312106

(51) Int. Cl.
*G06F 3/041* (2006.01)

(52) U.S. Cl.
USPC ........... 345/173; 345/156; 345/104; 345/174; 178/18.01; 178/18.06; 463/37; 463/38; 701/48; 701/36

(58) Field of Classification Search
USPC ................. 345/173, 156, 166–168, 179, 102, 345/104; 178/18.01–18.06; 463/37–38; 701/36, 41–48
See application file for complete search history.

(56) References Cited

U.S. PATENT DOCUMENTS

| | | | | |
|---|---|---|---|---|
| 6,373,472 | B1 * | 4/2002 | Palalau et al. | 345/173 |
| 7,260,454 | B2 * | 8/2007 | Pickering et al. | 701/2 |
| 2007/0089977 | A1 * | 4/2007 | Hirobe et al. | 200/512 |
| 2007/0188024 | A1 * | 8/2007 | Shitanaka et al. | 307/10.1 |
| 2007/0257889 | A1 * | 11/2007 | Croy | 345/170 |
| 2008/0036575 | A1 * | 2/2008 | Kim et al. | 340/332 |
| 2008/0084398 | A1 * | 4/2008 | Ito et al. | 345/173 |
| 2008/0305838 | A1 * | 12/2008 | Joo | 455/566 |
| 2009/0115933 | A1 * | 5/2009 | Mimura | 349/59 |
| 2009/0164062 | A1 * | 6/2009 | Aoki et al. | 701/36 |

FOREIGN PATENT DOCUMENTS

| | | | |
|---|---|---|---|
| EP | 1859992 | A1 | 11/2007 |
| JP | 2005-347193 | | 12/2005 |
| JP | 2006-321336 | A | 11/2006 |
| WO | 2007/132574 | * | 11/2007 |
| WO | WO2007/122479 | * | 11/2007 |

OTHER PUBLICATIONS

Japanese Office Action for Application No. 2007-312106 dated Apr. 24, 2012.

* cited by examiner

*Primary Examiner* — Lun-Yi Lao
*Assistant Examiner* — Md Saiful A Siddiqui
(74) *Attorney, Agent, or Firm* — Pearne & Gordon LLP

(57) ABSTRACT

An input apparatus includes: a display plate having a plurality of display sections; an electrostatic touch panel provided at a lower face of the display plate; an operation body on which the display plate and the electrostatic touch panel are placed; a plurality of light-emitting elements for illuminating the plurality of display sections of the display plate from a lower side of the display plate through the electrostatic touch panel; and a control section that is electrically connected to the electrostatic touch panel and the plurality of light-emitting elements, and that controls light emission of the plurality of light-emitting elements in accordance with touch operation to the electrostatic touch panel.

6 Claims, 6 Drawing Sheets

INPUT APPARATUS

BACKGROUND OF THE INVENTION

1. Field of the Invention

The present invention mainly relates to an input apparatus used for the operation of various electronic devices in an automobile.

2. Background Art

In recent years, many drivers of an automobile uses his or her fingers to operate an input apparatus such as a switch attached in the vicinity of a steering wheel, while still holding the steering wheel, to operate an electronic device such as an audio device or an air conditioner. In order to realize the application as described above, an input apparatus is preferred that is free from an operational error and that can be operated easily.

The conventional input apparatus as described above will be described with reference to FIG. 8 and FIG. 9.

FIG. 8 is a cross-sectional view illustrating a conventional input apparatus. The following section will describe the configuration of input apparatus 7 with reference to FIG. 8. Case 1 has a substantially box-like shape and is made of insulating resin. Operation body 2 is also made of insulating resin. An upper face of operation body 2 has display section 2C. Display section 2C is formed so that transparent or light-colored translucent section 2B having a predetermined shape (e.g., character, symbol, picture) for example is exposed out of non-translucent section 2A colored with black for example. Non-translucent section 2A is formed by a laser processing or a two-color molding for example. Operation bodies 2 are attached in opening holes of the upper face of case 1 so as to be movable in the up-and-down direction.

Switch 3 is a push switch for example that is formed so as to be turned ON or OFF when operation axis 3A protruding to the upper side is moved in the up-and-down direction. Operation axis 3A is abutted to projection 2D at the lower face of operation body 2.

Wiring substrate 4 has, at the upper and lower faces thereof, a plurality of wiring patterns (not shown). Switches 3, light-emitting elements 5 such as light-emitting diode, and control section 6 such as a microcomputer are mounted on the upper face of wiring substrate 4. Wiring substrate 4 is structured so that switch 3 and light-emitting element 5 are connected to control section 6 via the wiring pattern. In this manner, input apparatus 7 is configured so that case 1 covers wiring substrate 4 and control section 6 for example.

FIG. 9 is a front view illustrating a steering wheel including a conventional input apparatus. As shown in FIG. 9, input apparatuses 7 are attached to left and right spokes 9B sandwiched between steering wheel 9 and pad 9A accommodating the center air bag or the like so that operation bodies 2 are provided at the front faces of left and right spokes 9B. Control section 6 is electrically connected to an electronic circuit or an electronic device (not shown) of a vehicle via a connector, a lead wire (not shown) or the like.

When a driver uses the configuration as described above to extend a thumb for example, while holding steering wheel 9, to depress and operate operation body 2 on which a function that the driver intends to carry out is displayed, projection 2D at the back face of operation body 2 presses operation axis 3A to turn ON or OFF switch 3. Then, an electric signal is outputted from control section 6 to an electronic circuit or an electronic device of the vehicle to control various devices provided in the automobile (e.g., to increase or decrease the volume level of an audio device or the temperature of an air conditioner).

When a headlight or the like is lit to illuminate the periphery of the vehicle at night for example, control section 6 controls light-emitting elements 5 to emit light. This light illuminates operation body 2 from the lower face. Light passes translucent section 2B and illuminates display section 2C of the upper face. This allows, even when the periphery of the vehicle is dark, the driver to visually recognize the characters, symbol, picture or the like on display section 2C to easily identify or operate operation body 2.

In other words, the driver can, without separating his or her hand(s) from steering wheel 9 on which input apparatuses 7 are attached, extend only a thumb for example to operate any of operation bodies 2 to control a device in the vehicle, thus realizing an easy operation of the device while driving.

A technique regarding the above-described conventional input apparatus is disclosed in Japanese Patent Unexamined Publication 2005-347193 for example. In the conventional input apparatus, operation bodies 2 have functions for operation displayed by display sections 2C. When the periphery of the vehicle is dark, display sections 2C are illuminated by light-emitting elements 5. This conventional structure however had a disadvantage in that operation bodies 2 arranged to have a similar shape tended to cause an operational error such as the depression of a wrong operation body.

SUMMARY OF THE INVENTION

The input apparatus of the present invention includes: a display plate having a plurality of display sections; an electrostatic touch panel provided at a lower face of the display plate; an operation body on which the display plate and the electrostatic touch panel are placed; a plurality of light-emitting elements for illuminating the plurality of display sections of the display plate from a lower side of the display plate through the electrostatic touch panel; and a control section that is electrically connected to the electrostatic touch panel and the plurality of light-emitting elements, and that controls light emission of the plurality of light-emitting elements in accordance with touch operation to the electrostatic touch panel.

In the above input apparatus, when the display plate is being touched by a finger of a user for example, a plurality of display sections showing characters, a symbol, a picture or the like is illuminated. A different display section is illuminated in accordance with the movement of the finger of the user. This allows the user to clearly determine the function that the user intends to carry out. Thus, an input apparatus can be obtained that suppresses an operational error and that can be operated easily.

DETAILED DESCRIPTION OF PREFERRED EMBODIMENTS

The following section will describe an embodiment of the present invention with reference to FIG. 1 to FIG. 7.

Embodiment

Figure 1:
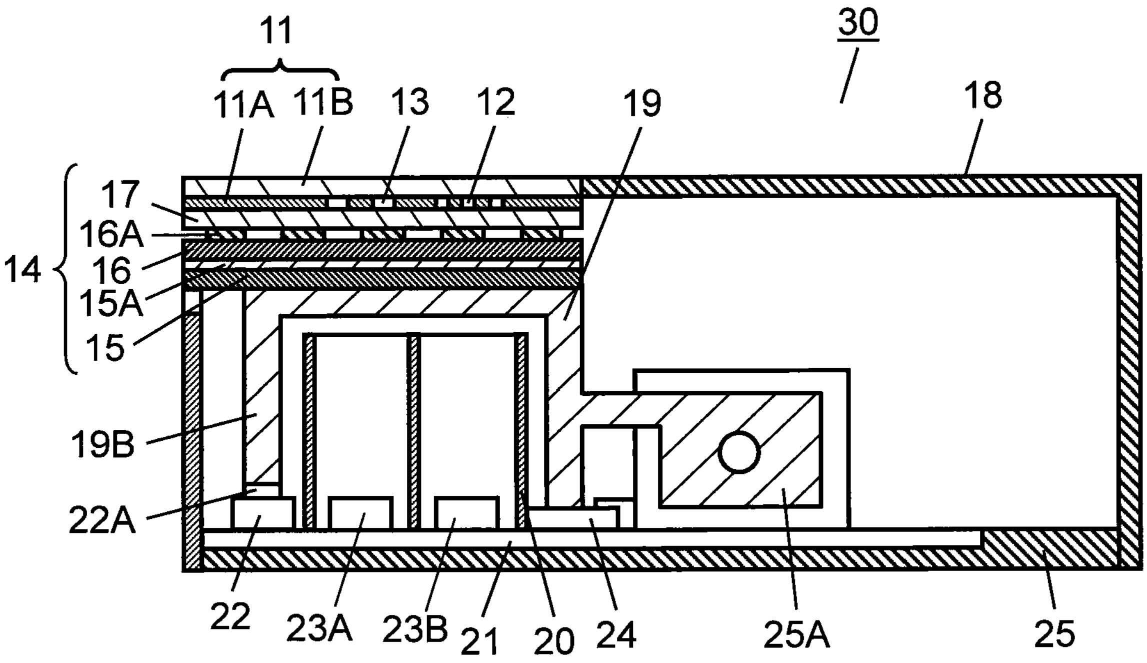
FIG. 1 is a cross-sectional view illustrating an input apparatus according to one embodiment of the present invention.
Figure 2:
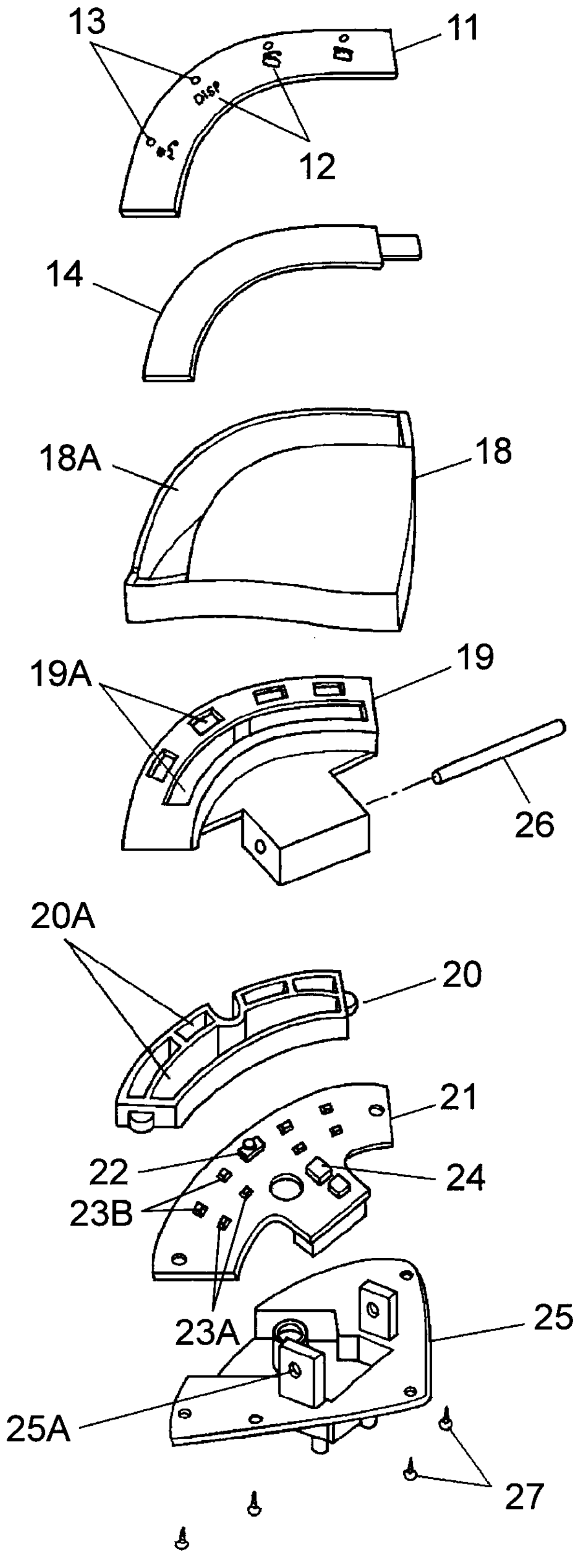
FIG. 2 is an exploded perspective view illustrating the input apparatus.
Figure 3:
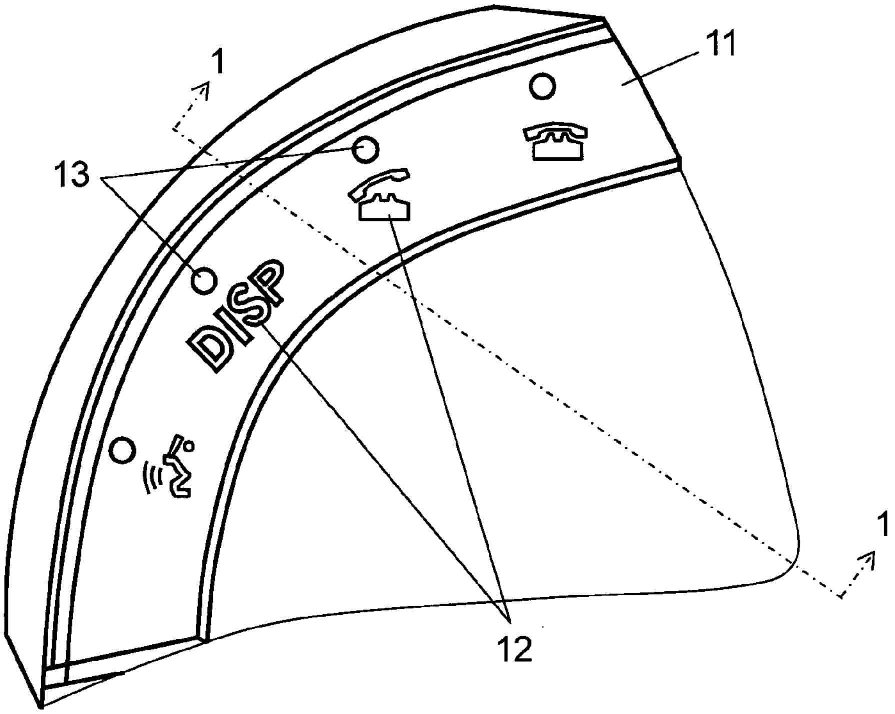
FIG. 3 is a perspective view illustrating the input apparatus.

FIG. 1 is a cross-sectional view illustrating an input apparatus according to one embodiment of the present invention. FIG. 2 is an exploded perspective view illustrating the input apparatus. FIG. 3 is a perspective view illustrating the input apparatus. FIG. 1 shows a cross section taken along the line 1-1 of FIG. 3. As shown in FIG. 1 and FIG. 2, display plate 11 includes light-blocking section 11A and cover section 11B. Cover section 11B has a substantially circular arc-like shape. Cover section 11B is made of insulating resin such as acryl or Acrylonitrile-Butadiene-Styrene (ABS) that has a dark color such as brown or black and that is translucent. At the lower face of cover section 11B, dark and non-translucent light-blocking section 11A is provided by printing or the like. First display section 12 functioning as a display section is formed by removing a predetermined shape from light-blocking section 11A. Second display section 13 functioning as a display section is formed by removing a substantially circular dot-like shape from light-blocking section 11A.

As shown in FIG. 3, first display section 12 in display plate 11 shows characters, a symbol, a picture or the like representing a function for operation. At the outer side vicinities of first display sections 12, substantially circular dot-like second display sections 13 are formed, respectively.

As shown in FIG. 1 and FIG. 2, substantially circular arc-like electrostatic touch panel 14 is provided at the lower face of display plate 11. Electrostatic touch panel 14 is formed by adhering lower substrate 15, lower conductive layer 15A, upper substrate 16, upper conductive layer 16A, and cover sheet 17 by adhesive agent (not shown) such as acryl or rubber, respectively. Electrostatic touch panel 14 is structured so that the upper face of film-like lower substrate 15 has thereon stripe-shaped lower conductive layers 15A. The upper face of lower conductive layer 15A has thereon upper substrate 16. The upper face of upper substrate 16 has thereon stripe-shaped upper conductive layers 16A extending in a direction orthogonal to lower conductive layer 15A. The upper face of upper conductive layer 16A has thereon film-like cover sheet 17.

Cover 18 is made of insulating resin such as polycarbonate or ABS. Operation body 19 is also made of insulating resin. Substantially circular arc-like end section of substantially circular arc-like operation body 19 is attached within substantially circular arc-like opening hole 18A at an end portion of cover 18 so that operation body 19 is movable in the up-and-down direction. At an end section of substantially circular arc-like operation body 19, translucent holes 19A are provided. At an upper face close to the end of operation body 19, display plate 11 and electrostatic touch panel 14 are superposed and are adhered to each other by adhesive agent for example.

Light-guiding body 20 is made of insulating resin such as polycarbonate or ABS. Wiring substrate 21 is made of paper phenol or glass-mixed epoxy for example. Light-guiding body 20 includes light-guiding holes 20A penetrating light-guiding body 20 in the up-and-down direction. At the upper and lower faces of wiring substrate 21, wiring patterns (not shown) are formed by a copper foil or the like. Switch 22 such as a push switch, first light-emitting element 23A and second light-emitting element 23B functioning as a light-emitting element such as a light-emitting diode, and control section 24 such as a microcomputer are mounted on the upper face of wiring substrate 21. First light-emitting elements 23A are provided at positions corresponding to first display sections 12, respectively. Second light-emitting elements 23B are provided at positions corresponding to second display sections 13, respectively.

Ends of lower conductive layer 15A and upper conductive layer 16A of electrostatic touch panel 14 are connected to control section 24 via a connector (not shown) for example. Switch 22 and first light-emitting elements 23A and second light-emitting elements 23B are connected to control section 24 via the wiring pattern. Operation axis 22A protruding from switch 22 to the upper side is abutted to projection 19B provided at the lower face of the end of operation body 19.

Case 25 is made of insulating resin such as polycarbonate or ABS. On the upper face of case 25, light-guiding body 20 and wiring substrate 21 are superposed. The end section of operation body 19 is rotatably retained by pin 26 in support hole 25A. The upper face of case 25 is covered by cover 18 and is fixed to cover 18 by screws 27. In this manner, input apparatus 30 is constituted.

Figure 4:
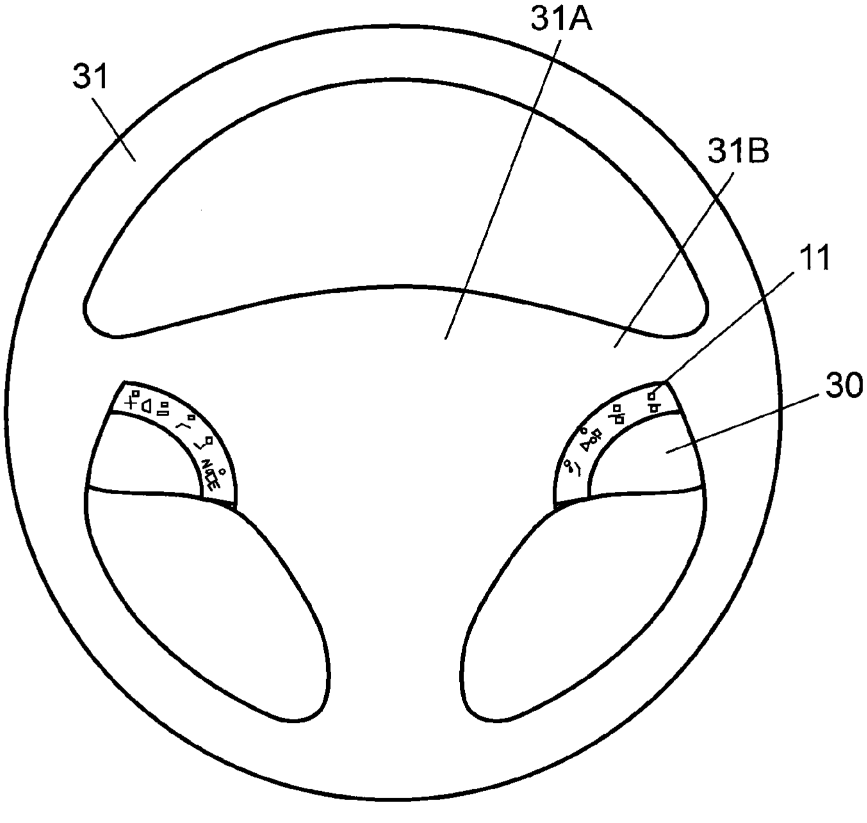
FIG. 4 is a front view illustrating a steering wheel including the input apparatus.

FIG. 4 is a front view illustrating a steering wheel including the input apparatus according to one embodiment of the present invention. As shown in FIG. 4, input apparatuses 30 are attached, when seen from the upper face of display plate 11, to left and right spokes 31B sandwiched between steering wheel 31 and pad 31A accommodating the center air bag or the like. Steering wheel 31 is attached to an automobile. Control section 24 is electrically connected to an electronic circuit or an electronic device (not shown) of the vehicle via a connector or a lead wire (not shown) for example.

Figure 5:
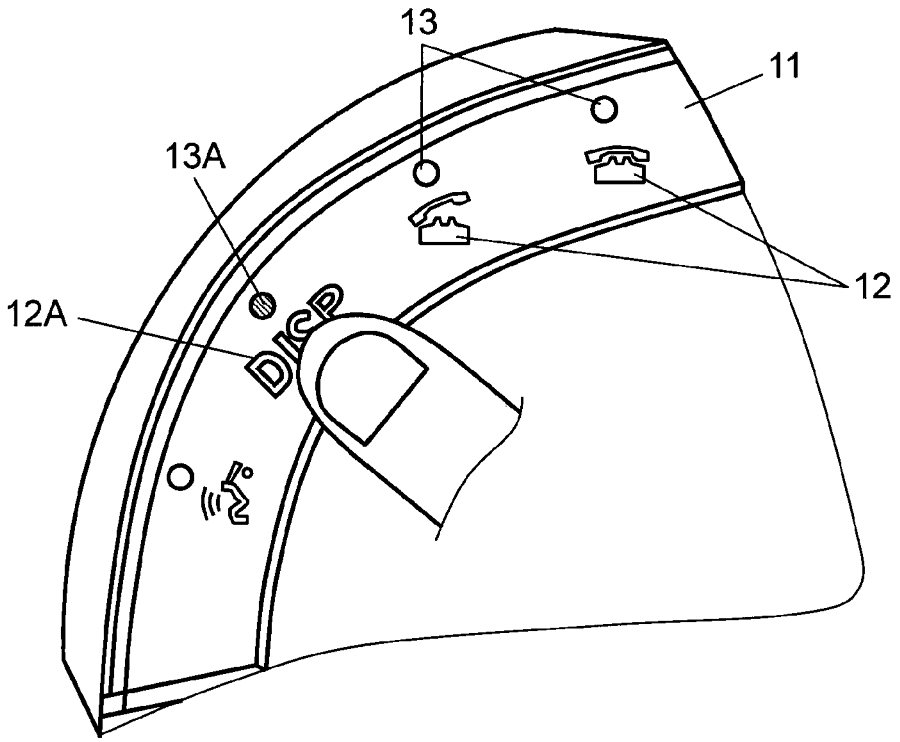
FIG. 5 is a perspective view illustrating when the input apparatus is touched and operated.

FIG. 5 is a perspective view illustrating when the input apparatus is touched and operated according to one embodiment of the present invention. As shown in FIG. 5, the driver extends his or her thumb to touch display plate 11 while holding steering wheel 31. Then, the capacitance of the finger causes a change in the voltage between lower conductive layer 15A and upper conductive layer 16A of electrostatic touch panel 14 at the lower face of display plate 11 at the position in display plate 11 touched and operated by the driver. Then, this change in the capacitance is detected by control section 24 to detect the position in display plate 11 touched by the finger.

At the same time, control section 24 causes first light-emitting element 23A and second light-emitting element 23B to emit light. This light passes light-guiding hole 20A of light-guiding body 20, translucent hole 19A of operation body 19, and electrostatic touch panel 14 to illuminate first display section 12 and second display section 13 of display plate 11 from its lower side. Then, control section 24 causes, among first light-emitting elements 23A and second light-emitting elements 23B, predetermined first light-emitting element 23A and predetermined second light-emitting element 23B to emit light.

With regards to first display sections 12 displaying functions for operation by characters, symbols, or pictures for example, not only first display section 12A at a position currently touched by the finger but also the rest of first display sections 12 are also all illuminated by first light-emitting elements 23A as shown in FIG. 5.

On the other hand, with regards to substantially circular dot-like second display sections 13 arranged at the outer side of first display sections 12, control section 24 controls the light emission by second light-emitting elements 23B so that only second display section 13A at a position currently touched by the finger is illuminated and the rest of second display sections 13 are not illuminated.

Figure 6:
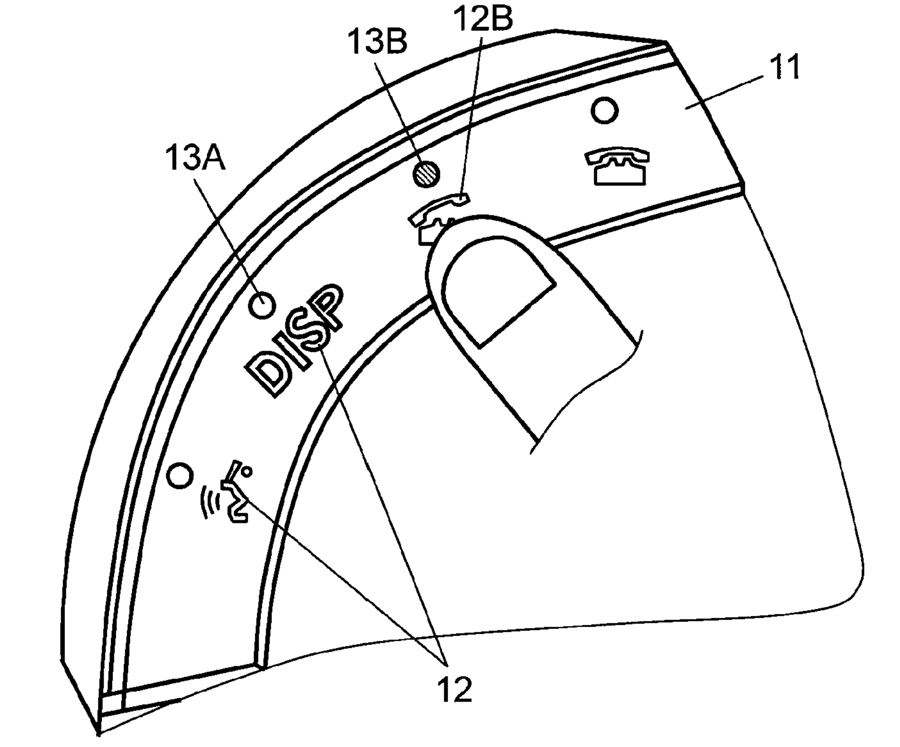
FIG. 6 is a perspective view illustrating when the input apparatus is touched and operated.

FIG. 6 is a perspective view illustrating when the input apparatus is touched and operated according to one embodiment of the present invention. As shown in FIG. 6, when the driver touches first display section 12B for example by moving the finger while still touching display plate 11 by the finger, control section 24 detects a change in the position touched by the finger as described above. Then, while all of first display sections 12 being illuminated, second display sections 13 not touched by the finger are not illuminated and only second display section 13B touched by the finger is illuminated.

Specifically, when the driver touches and operates display plate 11, first display sections 12 displaying functions for operation are all illuminated regardless of the position touched by the finger. Thus, the driver can visually recognize all function displays for operation. On the other hand, only second display section 13 touched by the finger of the driver is illuminated among second display sections 13. Thus, the driver can easily determine on which function display the finger is currently placed.

Specifically, when the driver touches and operates display plate 11, control section 24 controls the light emission of first light-emitting element 23A and second light-emitting element 23B to illuminate all first display sections 12. Thus, the driver can easily visually recognize all function displays even when the periphery is slightly dark. Furthermore, among second display sections 13 arranged with first display sections 12, only second display section 13 currently touched by the finger of the driver is illuminated. Thus, the driver can select a function for operation easily. Thus, an operational error can be prevented and an easy input operation can be realized.

Figure 7:
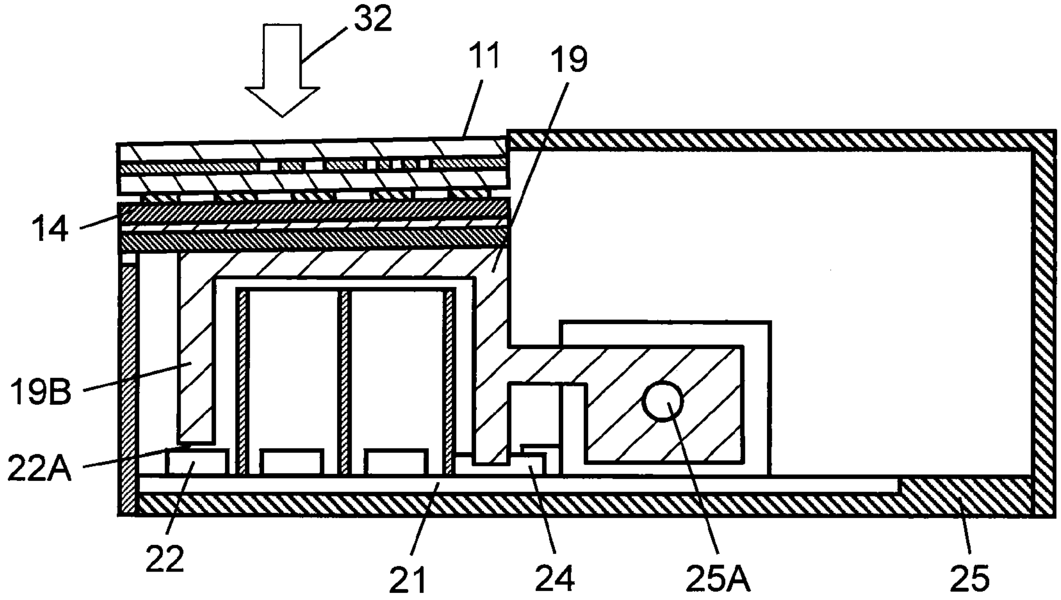
FIG. 7 is a cross-sectional view illustrating when the input apparatus is depressed and operated.
Figure 8:
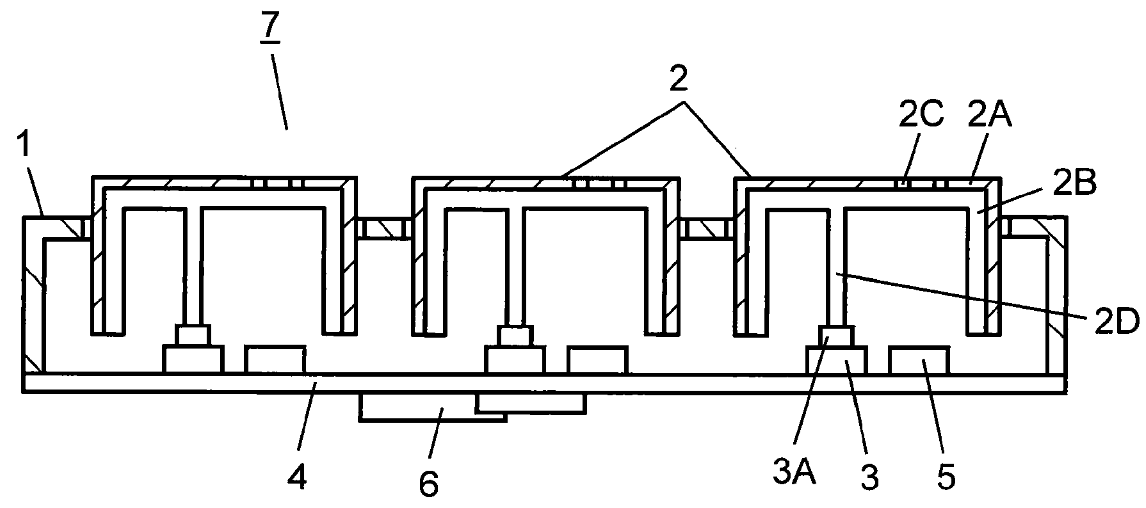
FIG. 8 is a cross-sectional view illustrating a conventional input apparatus.
Figure 9:
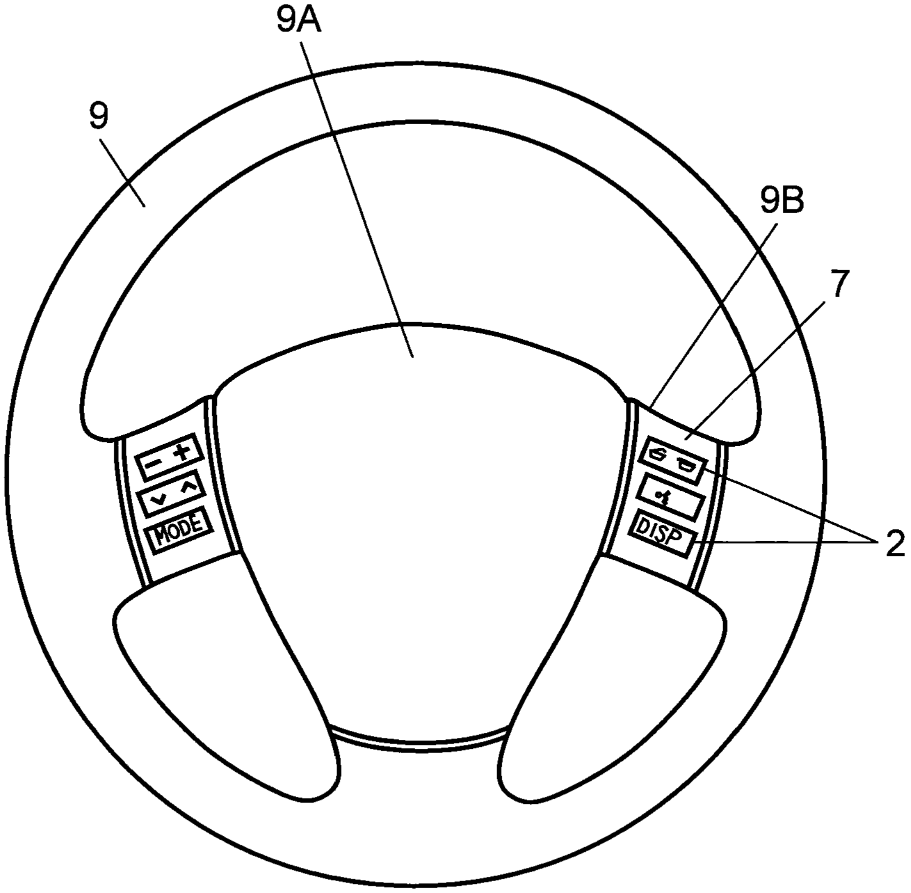
FIG. 9 is a front view illustrating a steering wheel including the input apparatuses.

FIG. 7 is a cross-sectional view illustrating when the input apparatus is depressed and operated according to one embodiment of the present invention. FIG. 7 illustrates when the input apparatus is depressed and operated in the cross-sectional view of the input apparatus of FIG. 1.

When the driver depresses and operates a function display for operation in display plate 11 in the direction shown by arrow 32 as shown in FIG. 7 while touching first display section 12B of FIG. 6 by the finger, operation body 19 whose upper face has thereon display plate 11 and electrostatic touch panel 14 is oscillated and rotated around support hole 25A of case 25 as a supporting point. Then, projection 19B provided at the lower face of operation body 19 presses operation axis 22A of switch 22, thereby turning ON or OFF switch 22.

The ON or OFF of switch 22 is detected by control section 24. An electric signal showing the ON or OFF and a signal showing the contact of first display section 12B are outputted from control section 24 to the electronic circuit or the electronic device of the vehicle to control various devices provided in the automobile that correspond to the functions displayed on display plate 11. Thus, the driver can speak through a telephone connected to the vehicle, for example.

In other words, control section 24 is electrically connected to electrostatic touch panel 14, first light-emitting element 23A, and second light-emitting element 23B. Control section 24 controls the light emission of first light-emitting elements 23A and second light-emitting elements 23B in accordance with the touch operation of electrostatic touch panel 14.

Even when the driver depresses and operates a function display for operation in display plate 11 while touching another first display section 12 other than first display section 12B of FIG. 6 by the finger, operation body 19 is rotated as described above to turn ON or OFF switch 22. This electric signal showing ON or OFF is outputted from control section 24. In this case, the position of display plate 11 touched and operated by the driver is different from that in the above-described case. Thus, a signal showing the position at which display plate 11 is touched is outputted to control other devices (e.g., to increase or decrease the volume level of an audio device or the temperature of an air conditioner).

When display plate 11 is touched by the finger of the driver and is depressed and operated, control section 24 detects the position touched and operated via electrostatic touch panel 14 and detects ON or OFF of switch 22 to output these signals. In this manner, switch 22 making ON or OFF by the up-and-down movement of operation body 19 is provided and various devices provided in the vehicle are controlled by allowing control section 24 to detect the ON or OFF of switch 22.

Specifically, control section 24 detects both the touched position of electrostatic touch panel 14 and the ON or OFF of switch 22. This eliminates the need to provide a plurality of switches. Thus, switch 22 can be used to constitute input apparatus 30, thus realizing a simple and low-cost apparatus.

Furthermore, display plate 11 and electrostatic touch panel 14 or the like formed to have a substantially circular arc-like shape as described above allow input apparatus 7 to be attached to steering wheel 31 of the vehicle in an easy manner. This allows the driver to move, while holding steering wheel 31 to which input apparatus 7 is attached, the tip end of his or her thumb over display plate 11 so as to draw a substantially circular arc-like line to easily touch and operate and to depress and operate display plate 11.

The above section has described the following configuration. Specifically, first display sections 12 showing functions for operation and substantially circular dot-like second display sections 13 are displayed and arranged on display plate 11. When display plate 11 is touched and operated by the driver, all first display sections 12 are illuminated and only second display section 13 touched by the finger is illuminated.

However, the present invention also can be carried out in another configuration in which second display section 13 is eliminated and a touched-and-operated position of first display section 12 is illuminated instead.

In this case however, only the touched-and-operated position of first display section 12 is illuminated. Thus, when the position touched by the finger is not a position showing the function that the driver intends to carry out, the driver is required to further move the finger to select a position for operation. Thus, another configuration above mentioned causes, although an operational error can be avoided, a slightly-complicated operation when compared with the above-described configuration.

As described above, according to the input apparatus of the embodiment of the present invention, display plate 11 having first display sections 12 and second display sections 13 and electrostatic touch panel 14 are provided on operation body 19. In accordance with the touch operation of electrostatic touch panel 14, control section 24 controls the light emission of first light-emitting element 23A and second light-emitting element 23B. This allows, when display plate 11 is being touched by the finger of the user, all first display sections 12 showing functions for operation for example are illuminated. In accordance with the movement of the finger, the position at which second display section 13 is illuminated is changed. This enables the user to clearly determine a function that the user intends to carry out. Thus, input apparatus 30 can be obtained that suppresses an operational error and that can be operated easily.

The above section has described the configuration using a single push switch as switch 22. However, the present invention also can be carried in another configuration that uses a switch obtained by providing a fixed contact point made of carbon or the like on the upper face of wiring substrate 21 and by placing a movable contact point made of a substantially dome-like conductive thin metal plate above the fixed contact. Also the present invention can be carried by using a switch using a substantially dome-like flexible rubber contact point whose lower face has a movable contact point for example.

The above section has described the configuration in which control section 24 is integrated with input apparatus 30. However, the present invention also can be carried in another configuration in which control section 24 provided in an electronic circuit of the vehicle detects the touch operation of electrostatic touch panel 14 and the ON or OFF of switch 22 to control the light emission of first light-emitting element 23A and second light-emitting element 23B.

The input apparatus of the present invention suppresses an operational error and can be operated easily. The input apparatus of the present invention is mainly useful for the control of various electronic devices of an automobile.

What is claimed is:

1. An input apparatus comprising:

a display plate having a plurality of display sections that comprises: a plurality of shapes and a plurality of touch positions identified by symbols;

an electrostatic touch panel provided at a lower face of the display plate;

an operation body on which the display plate and the electrostatic touch panel are placed, the operation body being up-and-down moveable together with at least the plurality of touch positions, wherein a switch is operationally connected to the operation body and provides ON or OFF in accordance with an up-and-down movement of the operation body, and wherein the plurality of touch positions move up together and move down to ether in the up-and-down movement with the operation body;

a plurality of light-emitting elements for illuminating at least some of the plurality of display sections of the display plate from a lower side of the display plate through the electrostatic touch panel; and a control section that is electrically connected to the electrostatic touch panel and the plurality of light-emitting elements, and that controls illumination of an individual shape of the plurality of shapes, in response to a touch in a vicinity of a touch position of the plurality of touch positions on the display plate, wherein the touch position is in the vicinity of the individual shape, and that does not cause, in response to said touch, illumination of an another shape of the plurality of shapes, wherein the individual shape is illuminated by a light emitting element of the plurality of light-emitting elements in response to said touch, and then that detects the ON or OFF of the switch in response to an up-and-down movement of the operation body together with all of the plurality of touch positions, wherein all of the plurality of touch positions are illuminated in response to said touch such that the individual shape and all of the plurality of touch positions are illuminated in response to the same touch.

2. The input apparatus according to claim 1, wherein:

the plurality of display sections have a plurality of first display sections and a plurality of second display sections, one of the plurality of second display sections comprises the individual shape and another one of the plurality of second display sections comprises the another shape, the touch position is located at one of the plurality of first display sections, and the plurality of second display sections are provided in the vicinity of the plurality of first display sections.

3. The input apparatus according to claim 2, wherein:

the plurality of light-emitting elements include a plurality of first light-emitting elements and a plurality of second light-emitting elements, the plurality of the first light-emitting elements are provided respectively at positions corresponding to the plurality of the first display sections, and the plurality of the second light-emitting elements are provided respectively at shapes of the plurality of shapes corresponding to the plurality of the second display sections.

4. The input apparatus according to claim 3, wherein: the control section causes one of the plurality of second light-emitting elements to illuminate one of the plurality of second display sections in the vicinity of one of the plurality of first display sections, in response to the touch of said one of the plurality of first display sections.

5. The input apparatus according to claim 3, wherein: said control section further controls a function of one or more vehicle devices that corresponds to the individual shape on the display plate, in response to said detected ON or OFF of the switch, wherein the individual shape is in the vicinity of the touch position, and a symbol at the touch position identifying the touch position provides a graphical representation of the function.

6. The input apparatus according to claim 1, wherein: the display plate and the electrostatic touch panel have a circular arc-like shape.

* * * * *